United States Patent
Hawry et al.

(10) Patent No.: US 10,875,688 B1
(45) Date of Patent: Dec. 29, 2020

(54) CHILD RESISTANT SENIOR FRIENDLY BOTTLE PACKAGING FOR LIQUIDS

(71) Applicant: Berlin Packaging, LLC, Chicago, IL (US)

(72) Inventors: Liam Hawry, Chicago, IL (US); Alex Garfield, Chicago, IL (US)

(73) Assignee: Berlin Packaging, LLC, Chicago, IL (US)

( * ) Notice: Subject to any disclaimer, the term of this patent is extended or adjusted under 35 U.S.C. 154(b) by 0 days.

(21) Appl. No.: 16/693,839

(22) Filed: Nov. 25, 2019

(51) Int. Cl.
   *B65D 50/04*     (2006.01)
   *G01F 11/04*     (2006.01)
   *G01F 11/02*     (2006.01)
   *A61J 1/14*      (2006.01)
   *B65D 47/20*     (2006.01)

(52) U.S. Cl.
   CPC .......... *B65D 50/043* (2013.01); *A61J 1/1412* (2013.01); *B65D 47/20* (2013.01); *G01F 11/028* (2013.01)

(58) Field of Classification Search
   CPC ...... B65D 50/043; B65D 47/20; A61J 1/1412; G01F 11/028
   USPC .................................................... 222/153.01
   See application file for complete search history.

(56) References Cited

U.S. PATENT DOCUMENTS

| | | | |
|---|---|---|---|
| 1,453,445 A | 2/1922 | Covell | |
| 1,684,313 A | 3/1927 | Graham | |
| 3,767,088 A | 10/1973 | Deussen | |
| 4,072,247 A | 2/1978 | Yamazaki | |
| 4,399,920 A * | 8/1983 | Swartzbaugh | B65D 41/06 215/211 |
| 4,445,626 A | 5/1984 | Steffen et al. | |
| 4,498,904 A | 2/1985 | Turner et al. | |
| 4,526,294 A | 7/1985 | Hirschmann et al. | |
| 4,936,490 A | 6/1990 | Battegazzore | |
| 4,962,868 A | 10/1990 | Borchard | |
| 5,746,349 A * | 5/1998 | Putteman | G01F 11/027 222/49 |
| 5,950,690 A | 9/1999 | Seidler | |
| 6,112,779 A * | 9/2000 | Camilla | A61J 1/2096 141/22 |
| 6,250,504 B1 * | 6/2001 | Maffei | A61J 1/2096 141/381 |
| 6,273,152 B1 | 8/2001 | Beuhler et al. | |

(Continued)

FOREIGN PATENT DOCUMENTS

| | | |
|---|---|---|
| EP | 0723921 | 7/1996 |
| EP | 0706487 | 9/2000 |

(Continued)

OTHER PUBLICATIONS

U.S. Pat. No. 333,250; Issue Date Dec. 29, 1885; O.P.Pell.

(Continued)

*Primary Examiner* — Vishal Pancholi
(74) *Attorney, Agent, or Firm* — Adam K. Sacharoff; Much Shelist, P.C.

(57) ABSTRACT

In one embodiment there is provided a bottle assembly to dispense a liquid. The assembly includes a bottle, a syringe, a cap and collar. The assembly includes a child-resistant adult-friendly retaining portion to permit the removal of the cap and collar. The syringe is configured to draw liquid from the bottle at a precise dosage and then when the cap and collar is removed the user can expel the liquid.

13 Claims, 14 Drawing Sheets

(56) References Cited

U.S. PATENT DOCUMENTS

| | | | | |
|---|---|---|---|---|
| 6,609,635 | B1* | 8/2003 | Maffei | G01F 11/025 |
| | | | | 222/309 |
| 6,770,056 | B2* | 8/2004 | Price | G01F 11/023 |
| | | | | 222/43 |
| 8,403,008 | B2* | 3/2013 | Bouix | A45D 34/04 |
| | | | | 141/27 |
| 8,851,339 | B2 | 10/2014 | Schultz et al. | |
| 9,283,363 | B1 | 3/2016 | Scorzelli et al. | |
| 9,427,064 | B2 | 8/2016 | Kim | |
| 9,452,263 | B2* | 9/2016 | Grunhut | A61M 5/31501 |
| 2017/0231365 | A1* | 8/2017 | Choi | B05B 11/001 |
| | | | | 222/383.1 |

FOREIGN PATENT DOCUMENTS

| | | |
|---|---|---|
| EP | 0931591 | 6/2002 |
| WO | 2000037896 | 6/2000 |
| WO | 2000060318 | 10/2000 |
| WO | 2015015390 | 2/2015 |

OTHER PUBLICATIONS cooljarz.com/products/crringe-child-resistant-syringe-in-a-bottle; May 16, 2015.
raepak.com/a-new-dispensing-cap-that-will-change-the-packaging-industry/; Apr. 24, 2017.
https://www.sgh-healthcaring.com/en/accessories-for-oral-dosing-syringes/22-capsule-essuyeuse-pipette-c2-ml.html; Apr. 17, 2019.

* cited by examiner

CHILD RESISTANT SENIOR FRIENDLY BOTTLE PACKAGING FOR LIQUIDS

FIELD OF THE INVENTION

The present invention relates generally to a bottle packaging assembly for liquids to be drawn off in doses, which has a child resistant senior friendly functionality.

BACKGROUND OF THE INVENTION

Bottle assemblies typically include a closure that may contain a pharmaceutical or nutritional product within a bottle or other container such as a liquid. These bottle assemblies essentially include a syringe means, with a piston associated with a cap that is maneuverable from the outside for sucking the liquid into the syringe. Markers on the outside of the cap is provided by means of which it is possible to assess from the outside the volume of liquid drawn. While these are aspects known in the industry, the prior art is devoid of unique "child-resistant" features that make the cap difficult for children to turn. It would be desirable to construct and implement an extremely simple push down and turn child resistant closure which is easy for adults to open while maintaining child resistance.

SUMMARY OF THE INVENTION

In one embodiment of the present invention there is provided a child-resistant, adult-friendly, bottle assembly to dispense a liquid. The bottle assembly includes a bottle having a neck portion defining an opening about an upper rim to create an internal reservoir for holding a liquid. A cap and collar assembly, defining a cap portion and a collar portion, is configured such that the cap portion is secured within the collar portion and vertically movable in relation to the collar portion. A child-resistant adult-friendly retaining means is configured to removably attach the cap and collar assembly to the neck portion of the bottle. The child-resistant adult-friendly retaining means is configured in a first position to lock the collar portion to the neck portion of the bottle and further configured in a second position to unlock the collar to allow the removal of the collar and cap assembly together as a unit from the bottle. Movement of the collar, separate from the vertical movement of the cap, manually being pressed down towards the bottle and rotated in a first direction unlocks the collar and cap assembly from the bottle. A syringe means is secured to the cap. The syringe means having a syringe tube positioned within the bottle when the cap and collar assembly is attached to the bottle, the syringe means is configured to draw a liquid from the bottle when the cap portion is vertically moved away from the collar portion and the cap and collar assembly is attached to the bottle, and further configured to expel a liquid from the syringe tube when the cap portion is vertically moved towards the collar portion either when the cap and collar assembly is attached to the bottle or unattached to the bottle.

The child-resistant adult-friendly bottle assembly of the present embodiment can be further defined such that the neck portion of the bottle further includes a bottom annual bead and a pair of locking lugs. The pair of locking lugs being positioned on the neck portion between the bottom annular bead and the upper rim.

The child-resistant adult-friendly bottle assembly of the present embodiment can be further defined such that the cap portion includes a top base terminating to a downwardly extending side wall. Dosage marking indicia can be positioned downwardly along the side wall and viewable on the outside of the cap portion as the cap portion is vertically moved in relation to the collar portion. The side wall can further include a bottom lip extending outwardly. The side wall can further include an indented section configured along a portion of the side wall. The indented section includes a flange extending along and attaching to an arm. The arm being wider than the flange to create channels on either side of the flange between the indented section and the arm.

The child-resistant adult-friendly bottle assembly of the current embodiment can be further defined by having the collar portion including an external cylindrical wall extending from a top rim to a bottom rim. An indented wall section defined along a section of the external cylindrical wall has a slot defined therein. The indented wall section and slot are configured to receive the flange of the cap portion with the arm of the cap portion situated externally along the indented wall section on the external cylindrical wall and the side wall of the cap portion situated internally to the indented wall section of the collar portion to create vertical movement of the cap portion in relation to the collar portion. A ledge projects inwardly from an internal surface of the external cylindrical wall and being positioned towards the top rim. The cap portion being vertically movable in relation to the collar portion with the ledge of the external cylindrical wall and the bottom lip acting together as an upper limit of movement between the cap portion and collar portion.

The child-resistant adult-friendly bottle assembly of the current embodiment can be further defined by having a dosage of liquid within the syringe tube configured to match the dosage marking indicia as the cap portion is moved and the dosage marking indicia aligns with the top rim of the collar portion.

The child-resistant adult-friendly bottle assembly of the current embodiment can be further defined by having the syringe means configured to draw and expel a liquid as the cap portion is vertically moved in relation to the collar portion. The syringe means has a syringe tube with an opening configured to rest within the bottle to draw and expel a liquid. A piston extending downwardly from an underside portion of the top base of the cap portion and a piston plug secured to the piston is used with the cap portion and collar portion.

The child-resistant adult-friendly bottle assembly of the current embodiment can be further defined by having the collar portion including a surface member extending inwardly from the external cylindrical wall. An upstanding well wall and a downwardly extending well wall both extending from the surface member define an internal well opening within the upstanding and downwardly extending well walls. The downwardly extending well wall is configured to rest within the opening of the bottle and the internal well includes radially inward lips defined as an upper lip and lower lip spaced to engage and capture a head defined on a top portion of the syringe tube. The upstanding well wall is configured to receive the piston and frictionally fit the piston plug such that movement of the cap portion and thus piston and piston plug within the upstanding well wall draws and expel liquid from the syringe tube.

The child-resistant adult-friendly bottle assembly of the current embodiment can be further defined by having a pair of latches, separately corresponding to each of the locking lugs, in the pair of locking lugs. Each locking lug includes an entrance ramp tapering downwardly towards the annual bead leading into a channel. The channel being positioned slightly higher than an end wall of the entrance ramp to create a seat between the end wall and a defined stop wall. The collar portion is locked when the latches are positioned in the seats and the collar and cap assembly is removably from the bottle when the collar portion is pressed down until the latches are below the end wall and then the collar portion is twisted to move the latches into the entrance ramp thereby releasing the collar and cap assembly from the bottle.

The child-resistant adult-friendly bottle assembly of the current embodiment can be further defined by having the pair locking lugs spaced 180° from each other around the neck portion.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein.

DETAILED DESCRIPTION OF THE DRAWINGS

Figure 1:
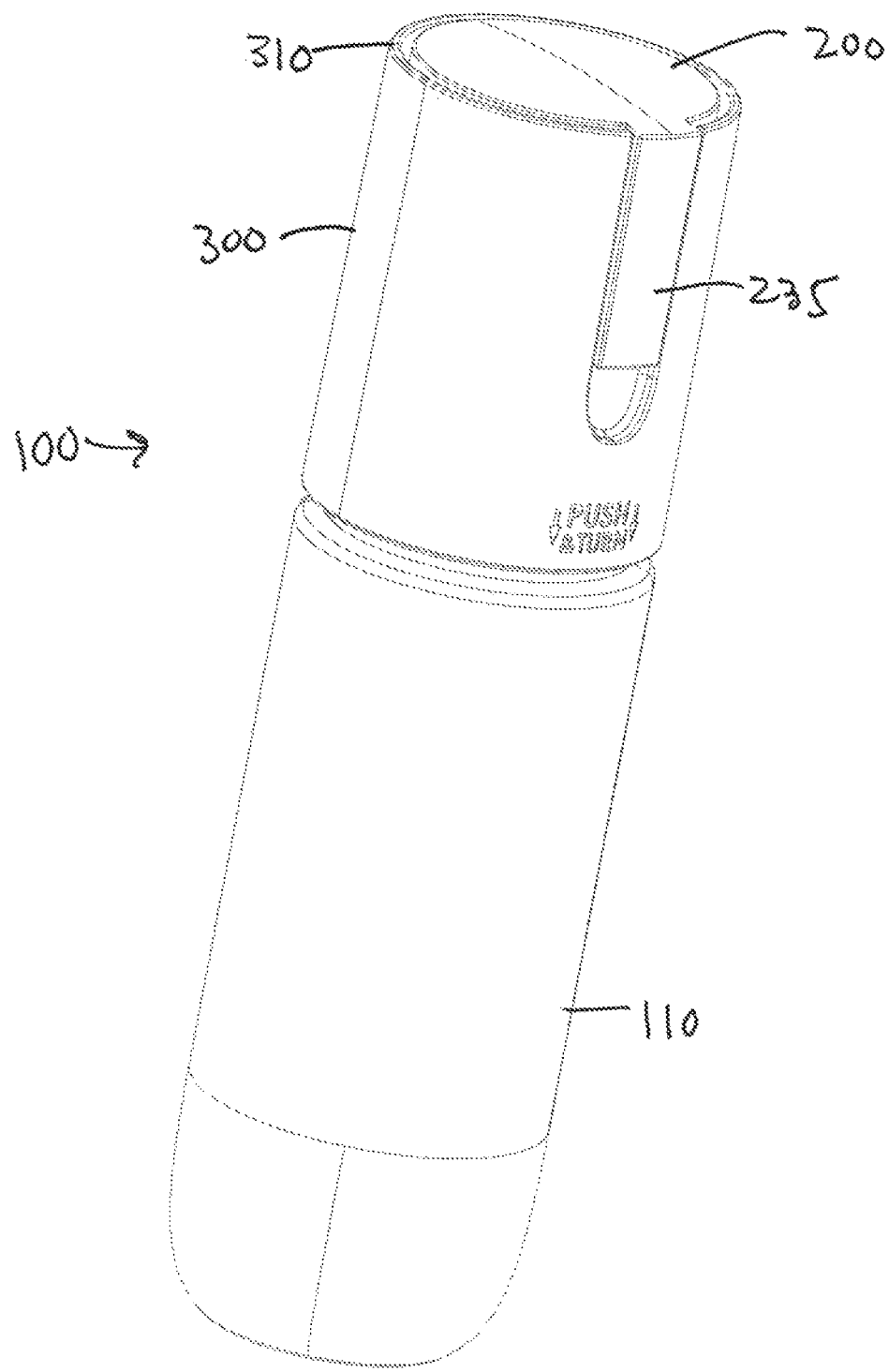
FIG. 1 is a perspective view of the bottle assembly for dosing liquids in accordance with an embodiment of the present invention.

While the invention is susceptible to embodiments in many different forms, there are shown in the drawings and will be described in detail herein the preferred embodiments of the present invention. It should be understood, however, that the present disclosure is to be considered an exemplification of the principles of the invention and is not intended to limit the spirit or scope of the invention and/or claims of the embodiments illustrated.

Figure 2:
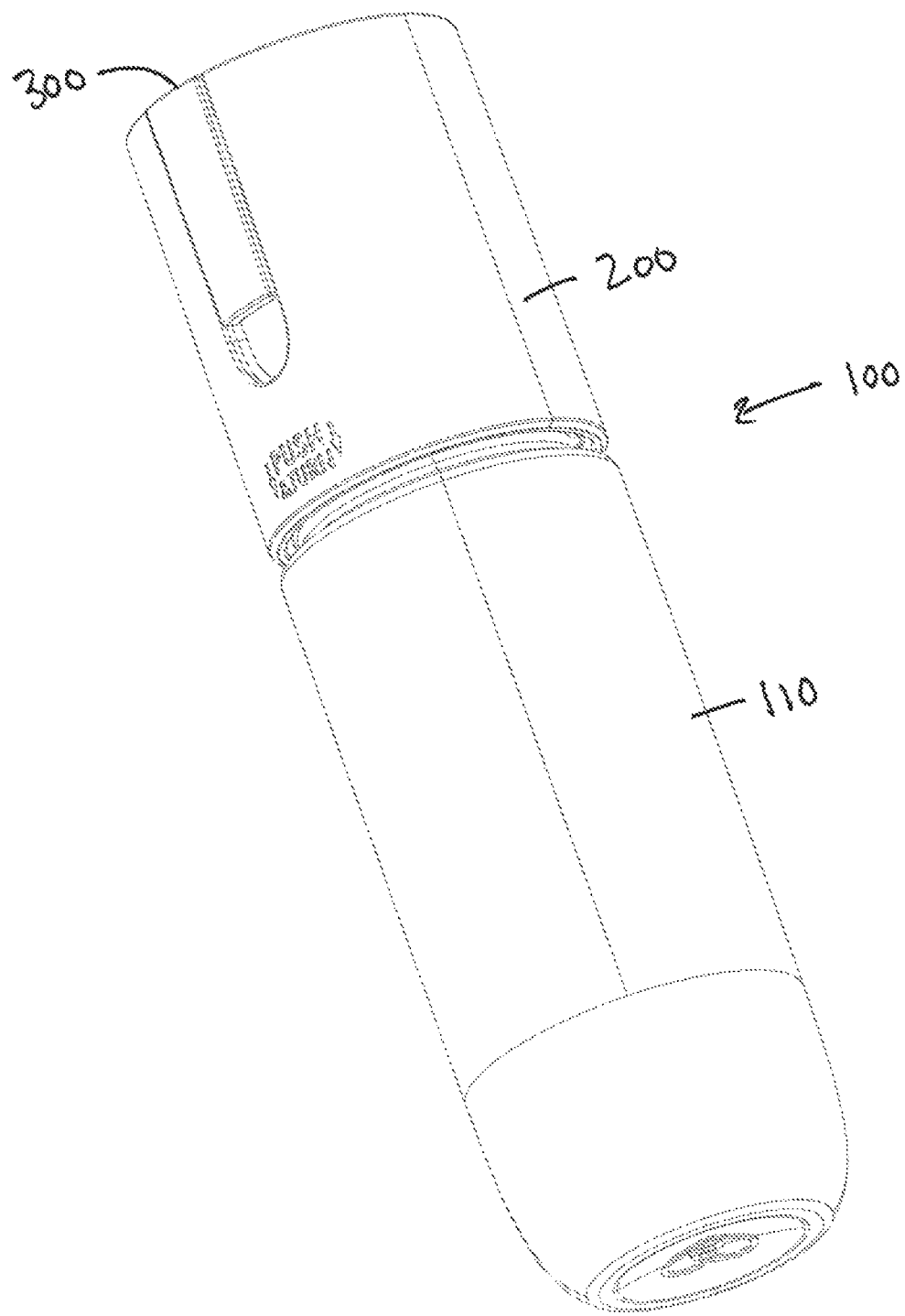
FIG. 2 is another view of the bottle assembly.
Figure 3:
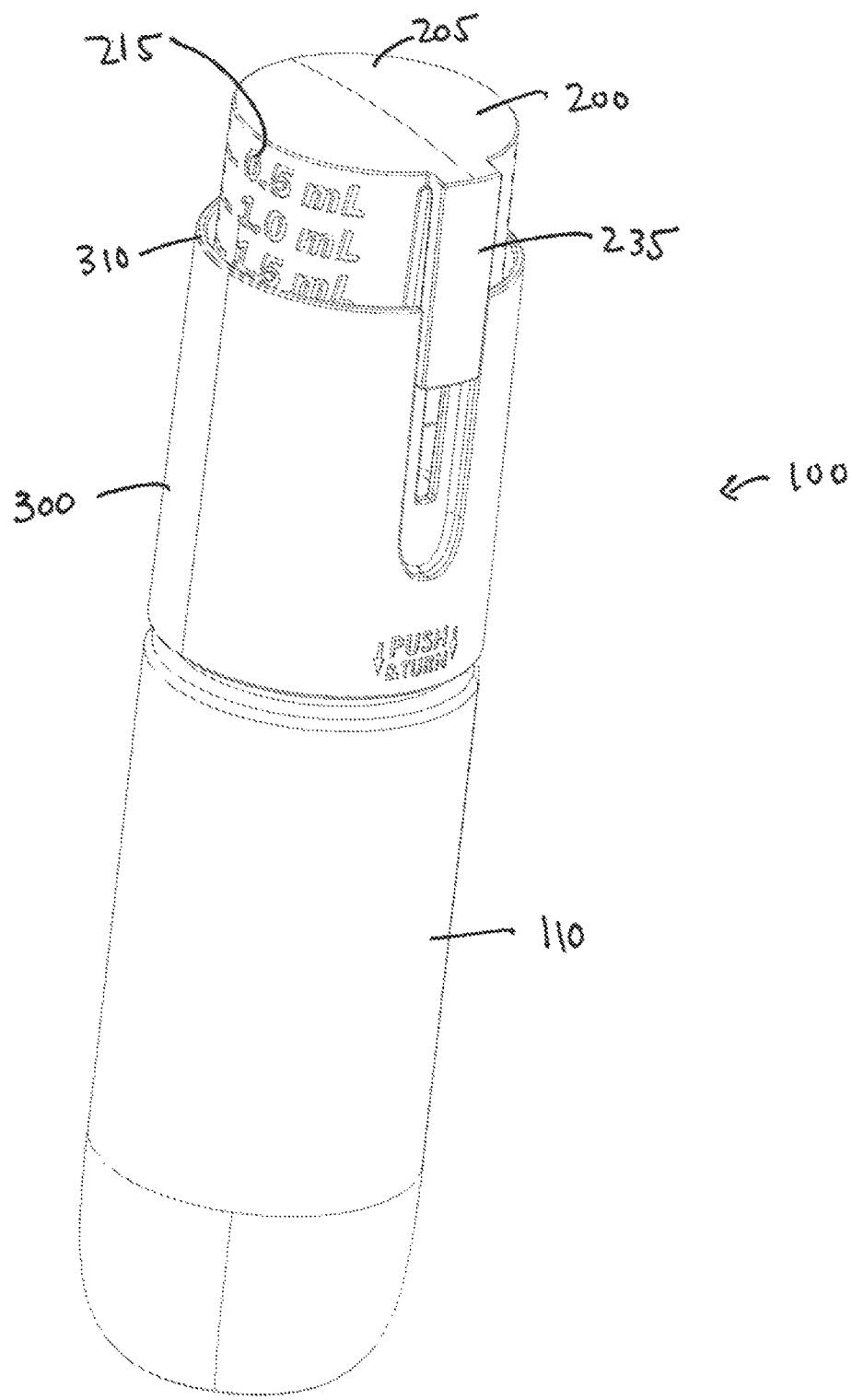
FIG. 3 is a perspective view showing the visual dosage markings on the cap.
Figure 4:
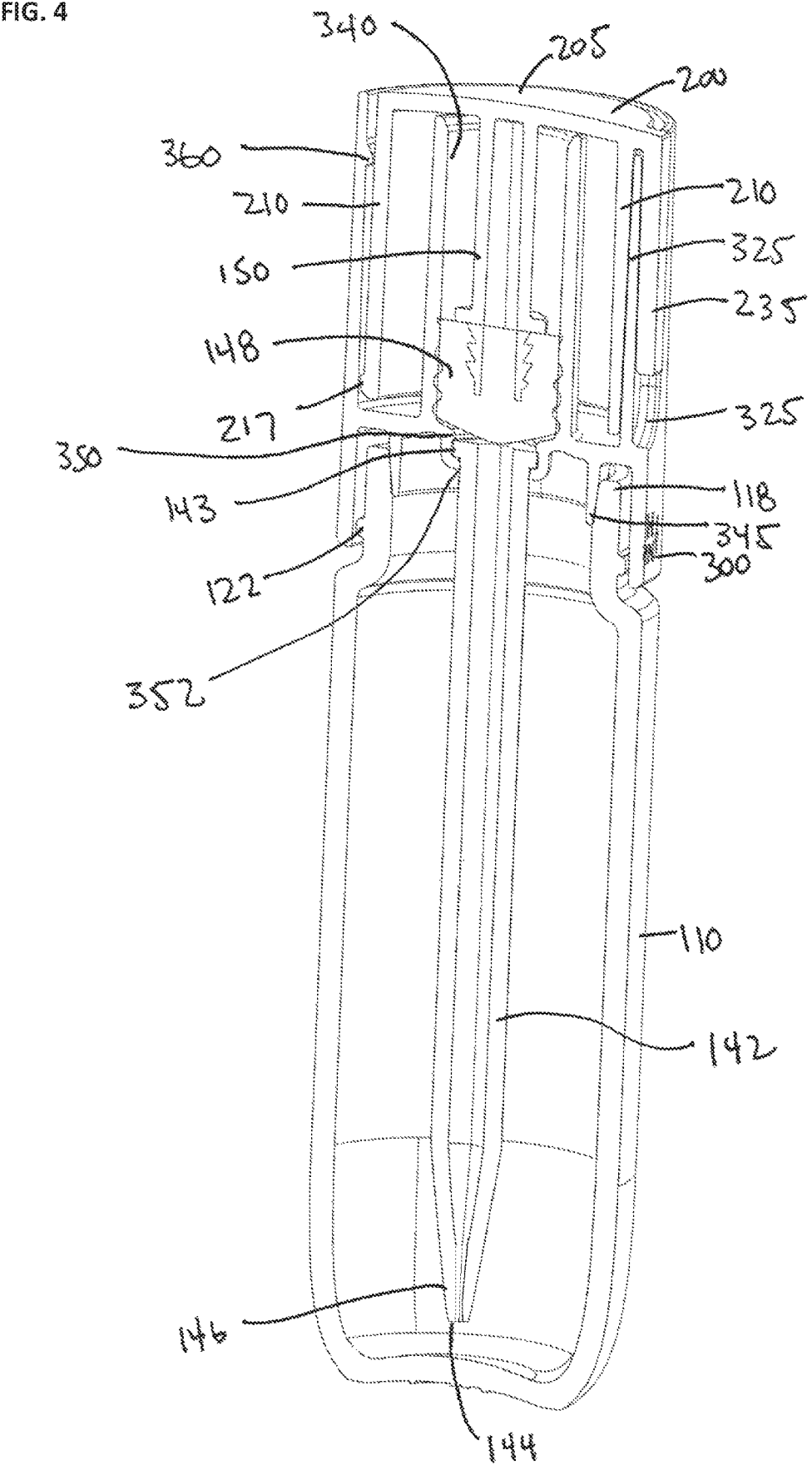
FIG. 4 is a cross section view of the bottle assembly in accordance with an embodiment of the invention.
Figure 5:
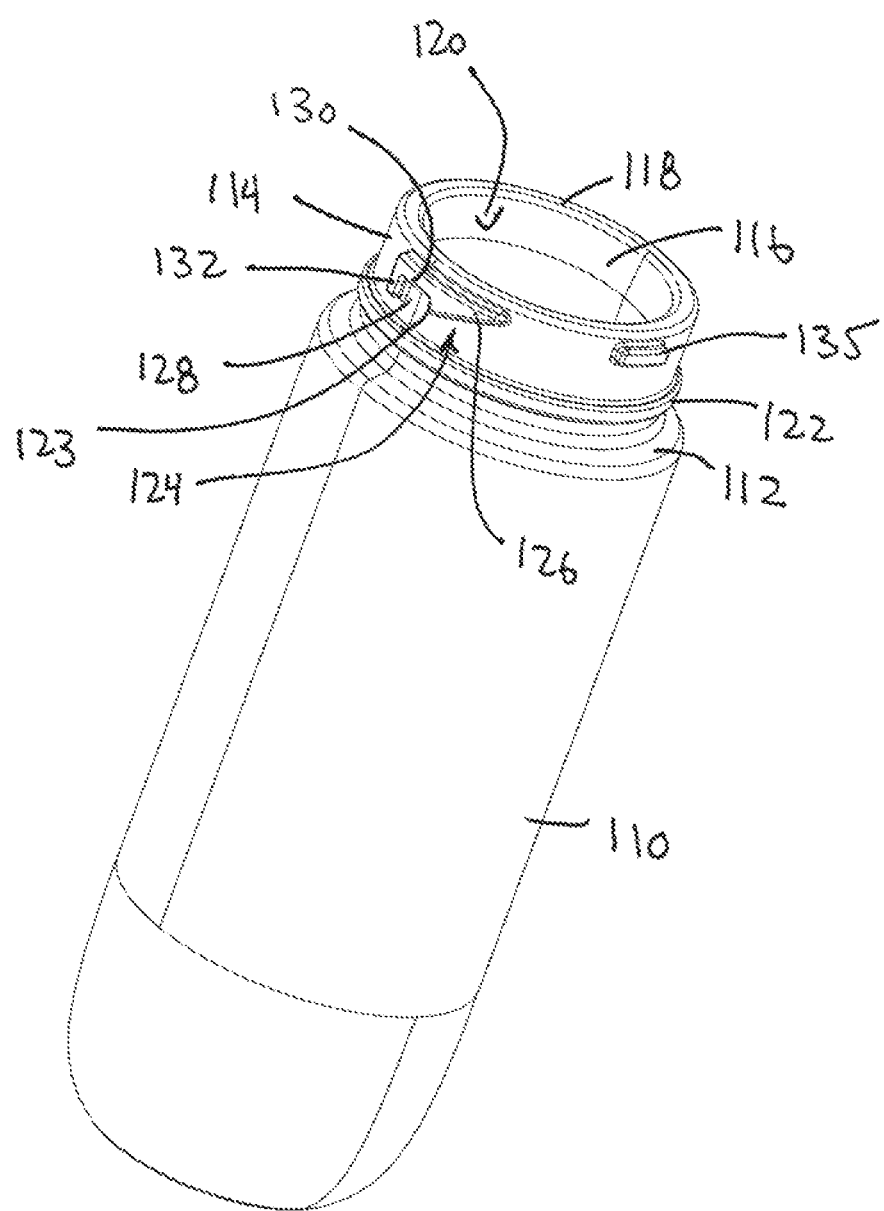
FIG. 5 is a view of a bottle used in a bottle assembly in accordance with an embodiment of the invention.
Figure 6:
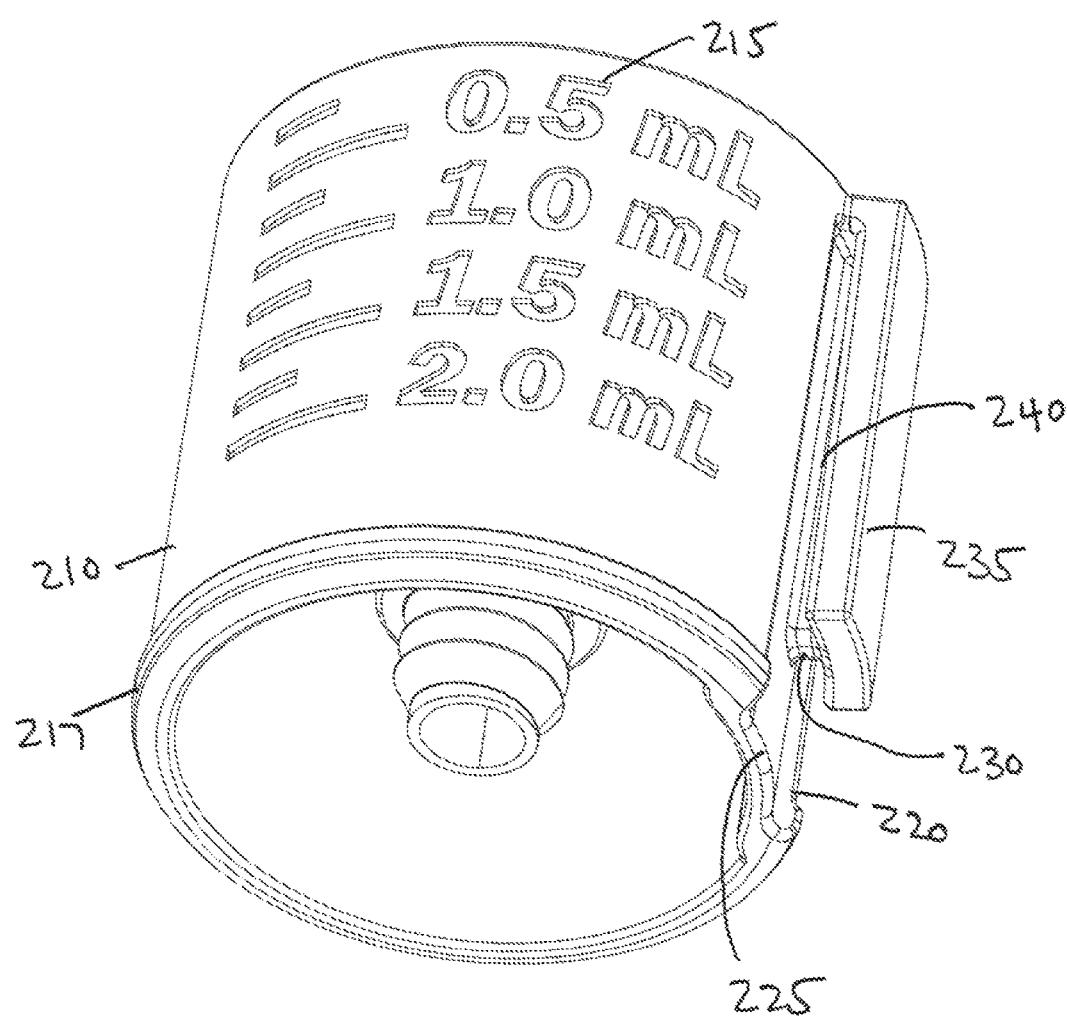
FIG. 6 is a view of the cap used in a bottle assembly in accordance with an embodiment of the invention.
Figure 7:
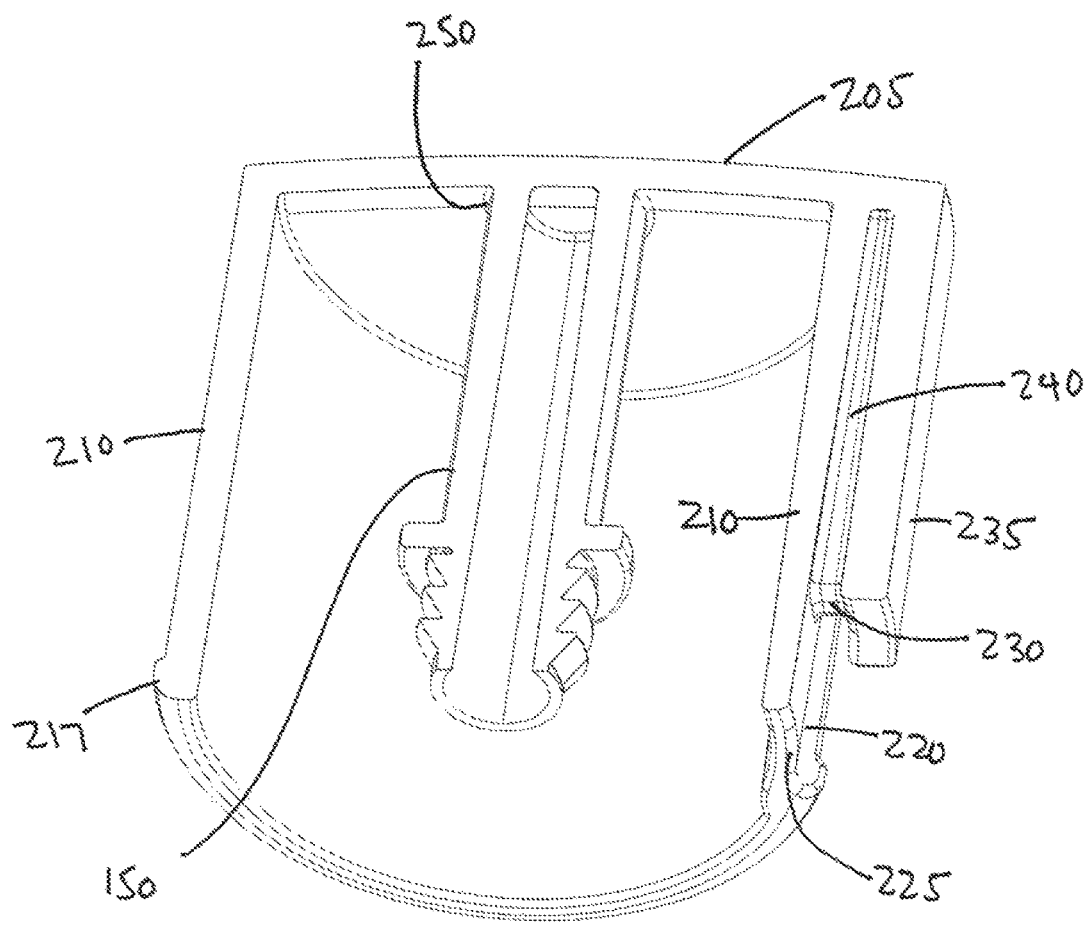
FIG. 7 is a sectional view of the cap from FIG. 6.
Figure 8:
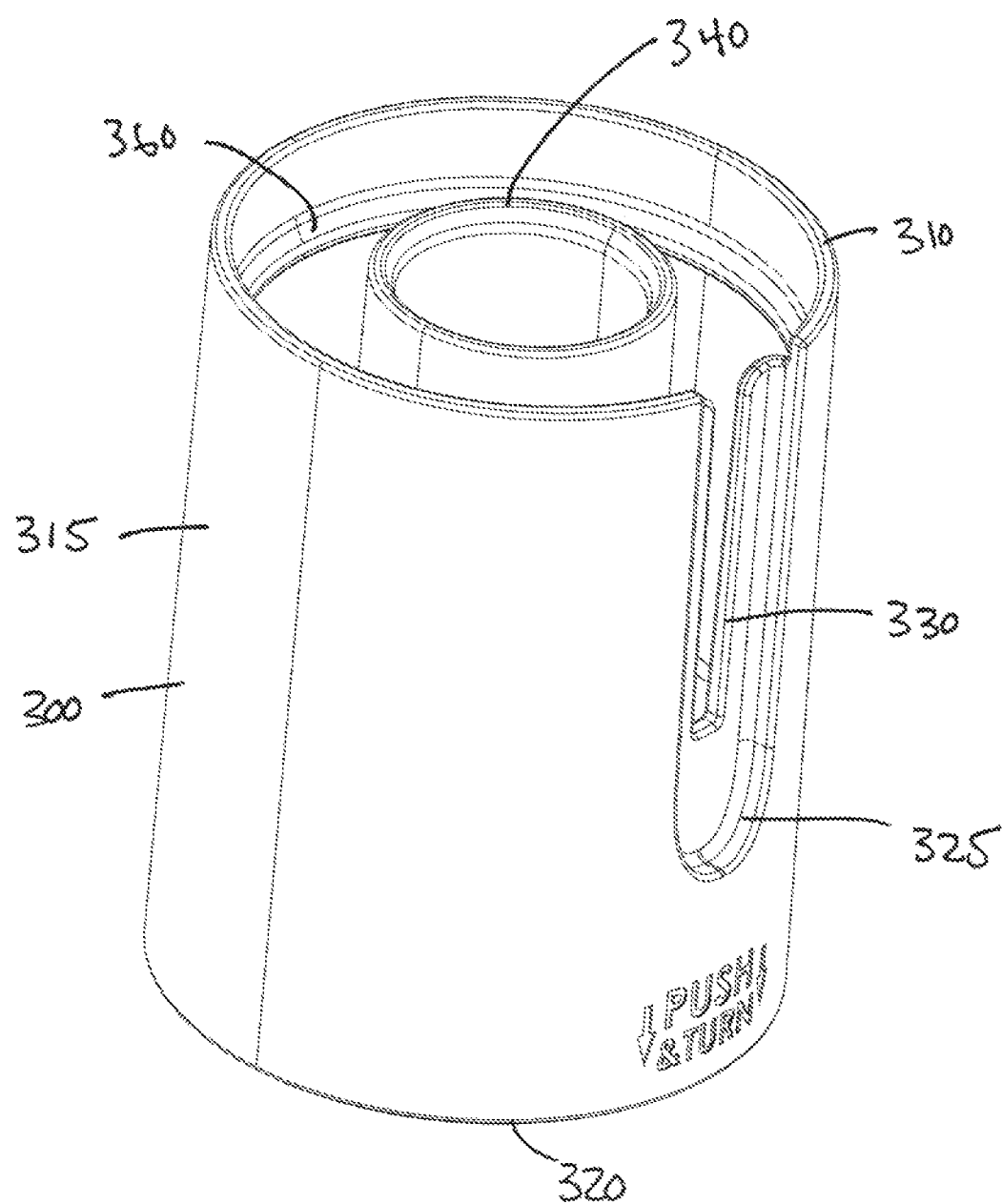
FIG. 8 is a perspective view of a collar used in a bottle assembly in accordance with an embodiment of the invention.
Figure 9:
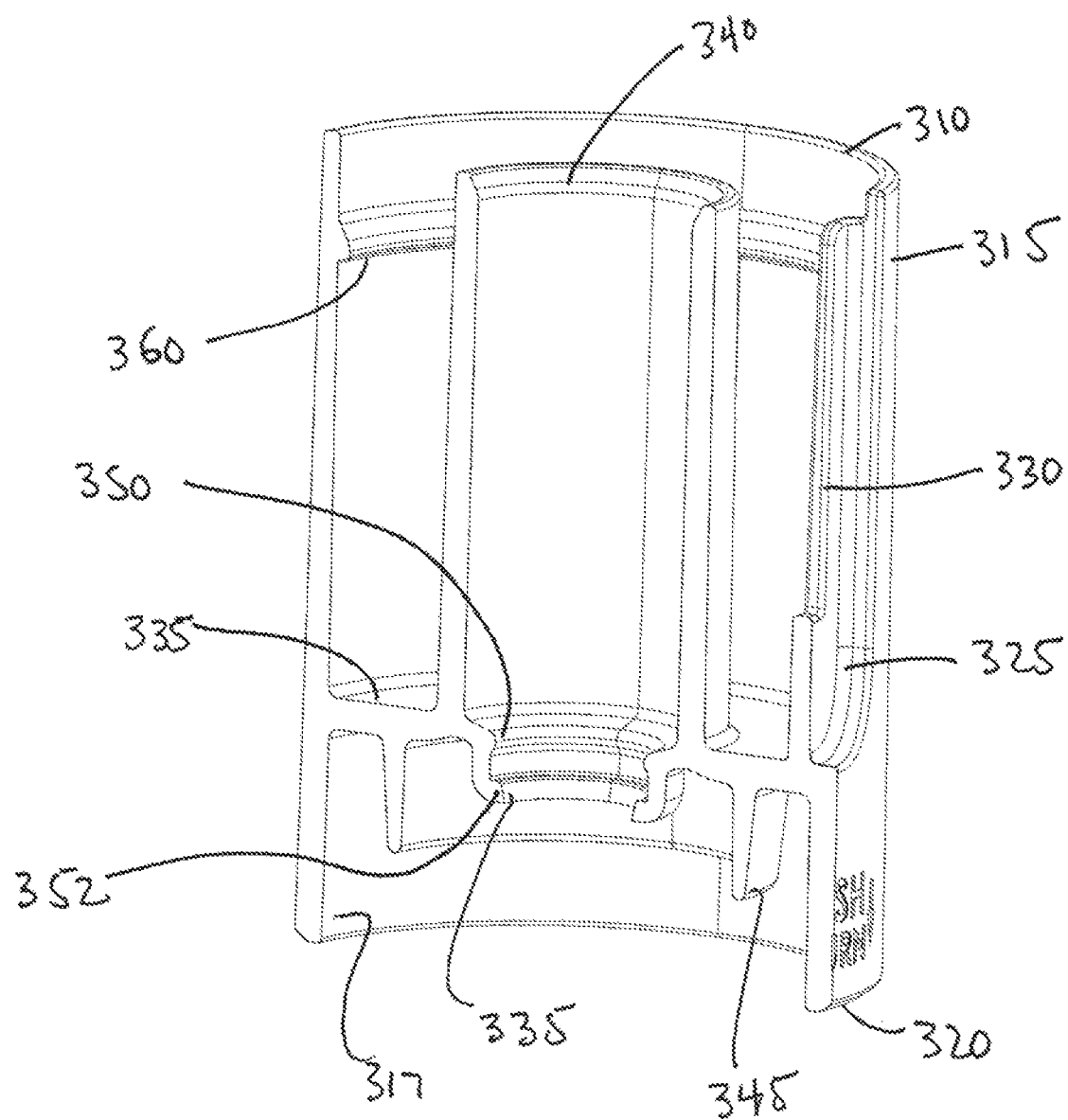
FIG. 9 is a sectional view of the collar from FIG. 8.
Figure 10:
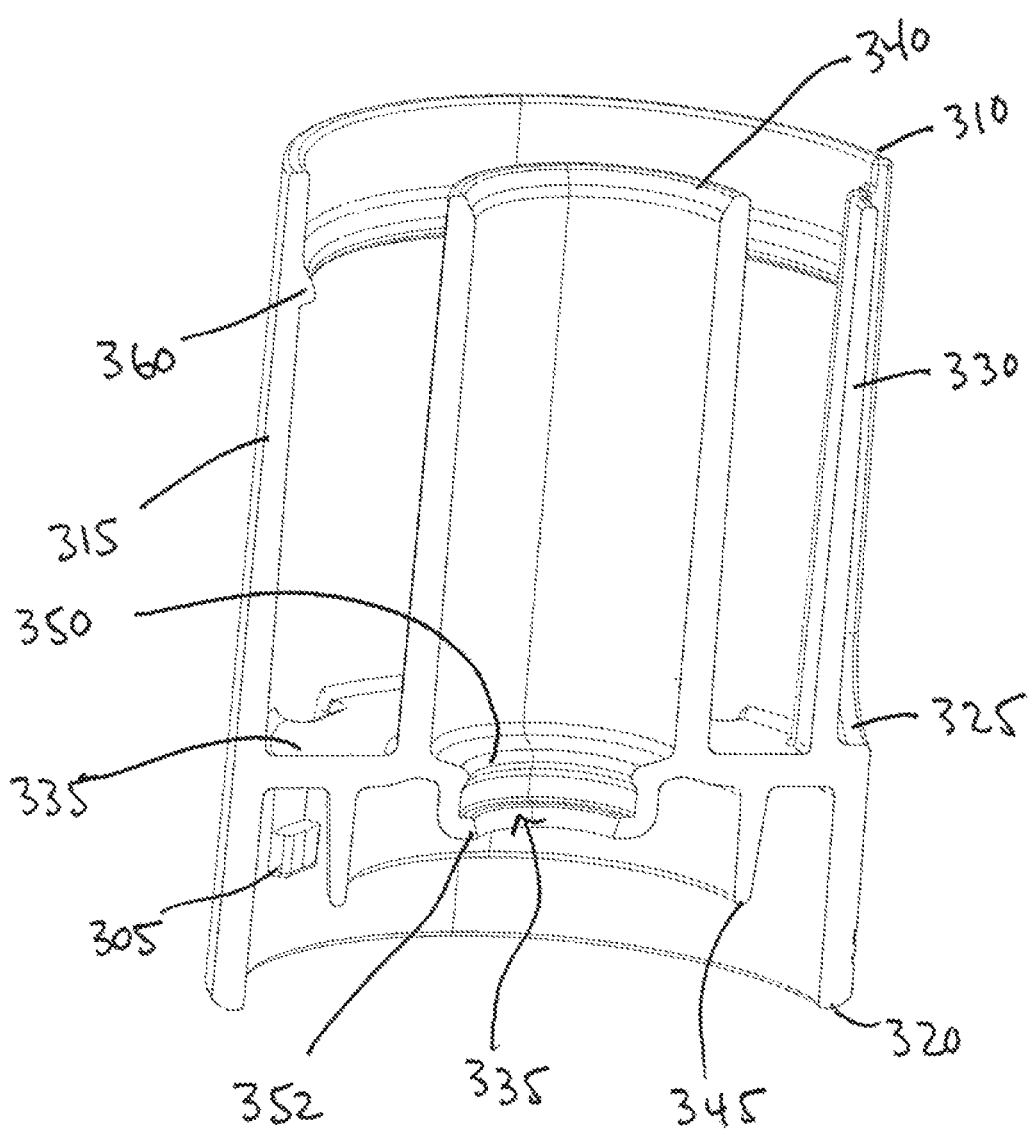
FIG. 10 is another sectional view of the collar from FIG. 8.
Figure 11:
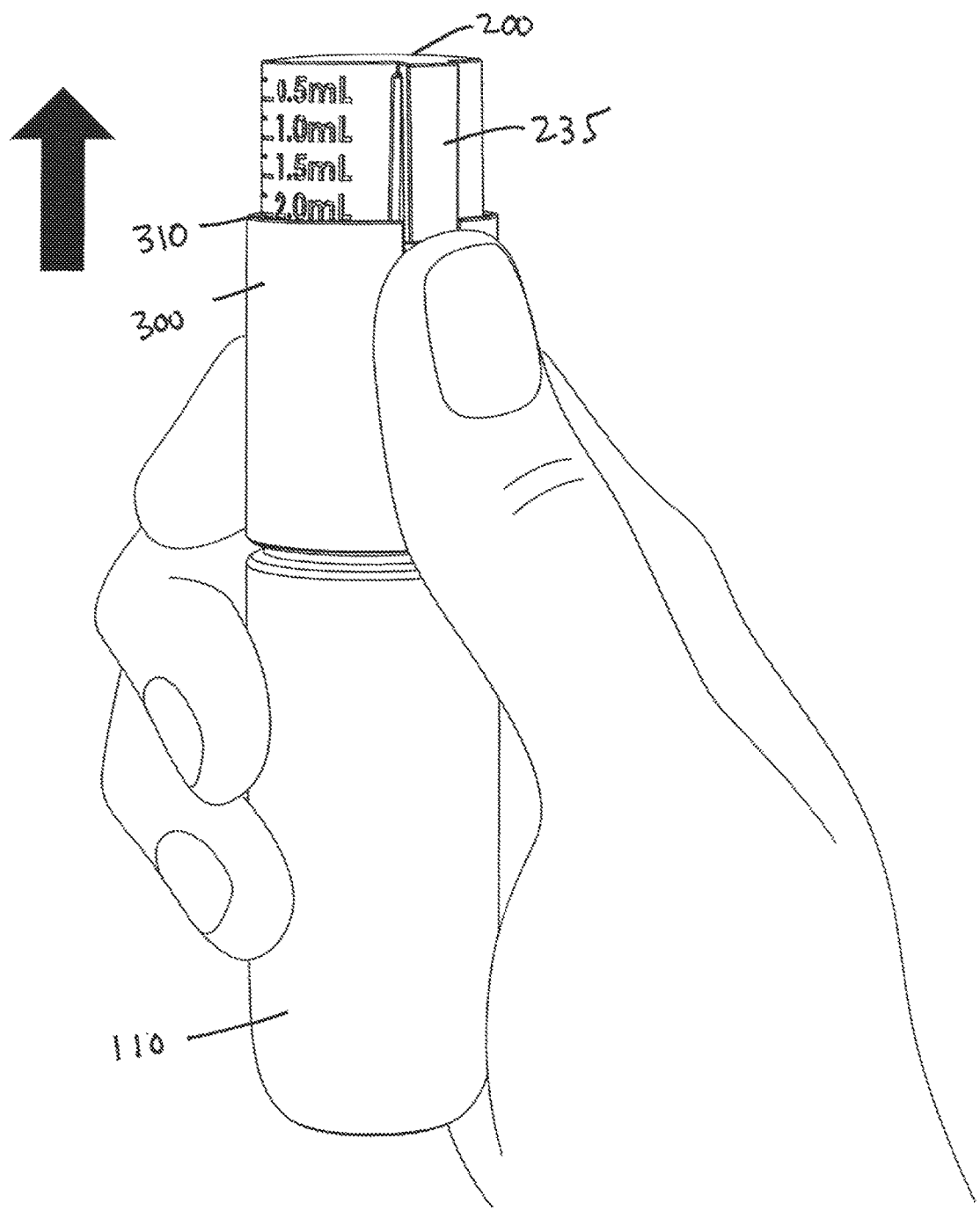
FIG. 11 is an operational view of a bottle assembly in accordance with an embodiment of the invention, illustrating the movement of the cap in relation to the collar.
Figure 12:
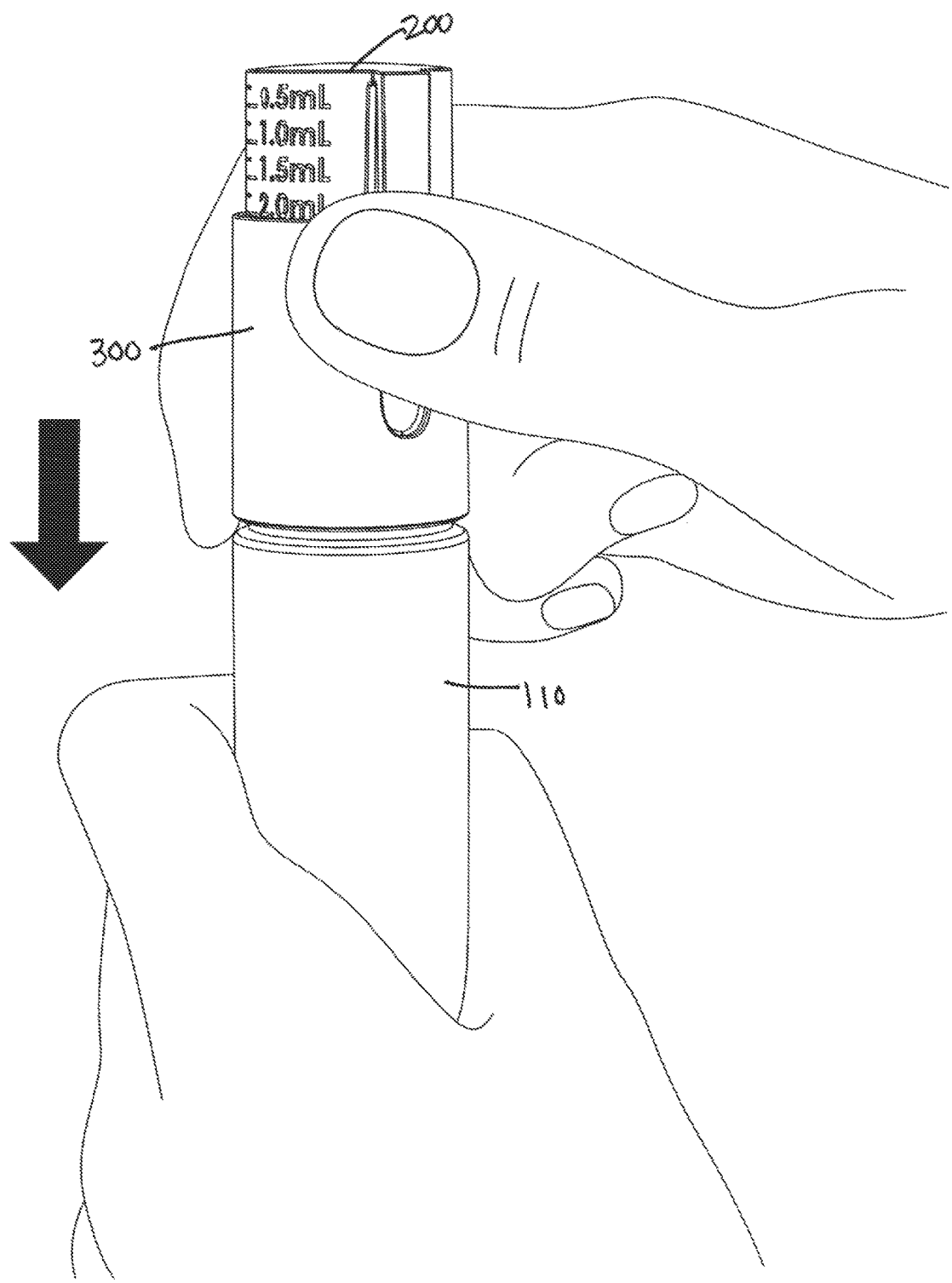
FIG. 12 is an operational view of a bottle assembly in accordance with an embodiment of the invention, illustrating the movement to remove the cap form the bottle.
Figure 13:
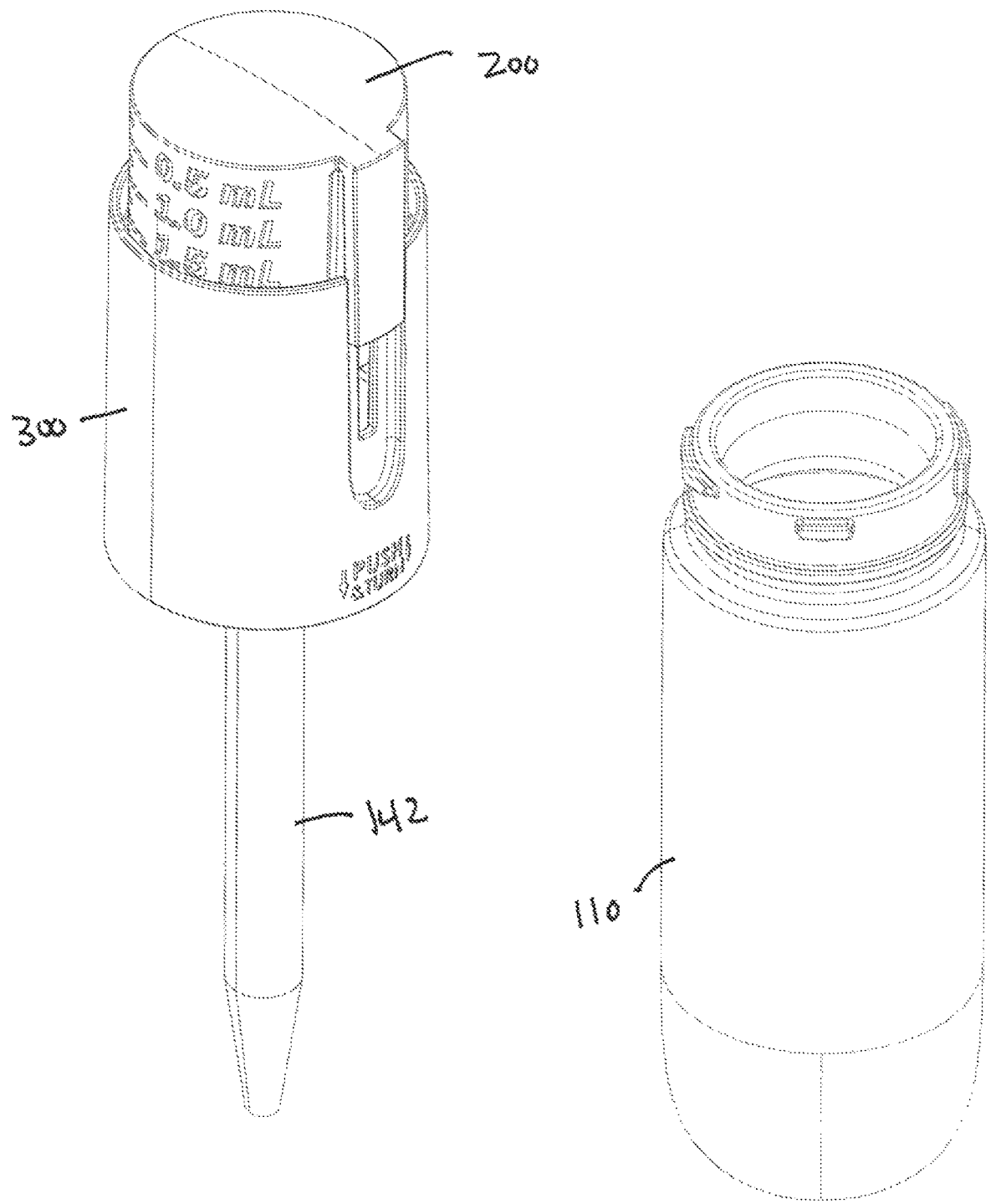
FIG. 13 is a view of the bottle assembly showing the cap removed from the bottle.
Figure 14:
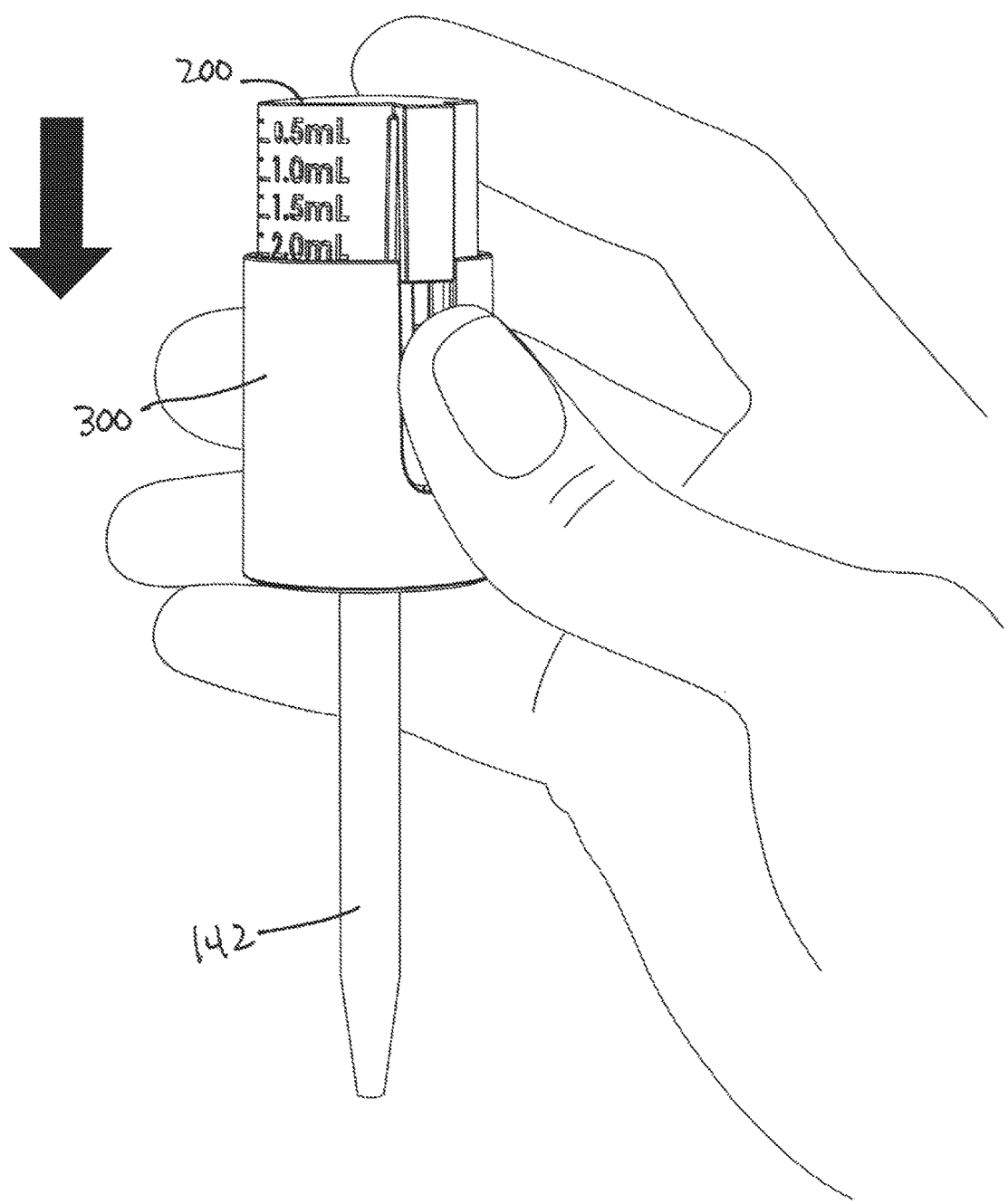
FIG. 14 is an operational view of a bottle assembly in accordance with an embodiment of the invention, illustrating the movement of the cap in relation to the collar to dispense the liquid in a syringe.

Referring now to the figures, namely FIGS. 1 through 14, there is shown a bottle assembly 100 for the storing and dispensing of a liquid which may include forms of medication. The bottle assembly 100 is preferably a child-resistant adult friendly assembly 100, meaning it is difficult for a child to open and easier for an adult to open and dispense. The bottle 100 preferably includes a bottle 110 with a syringe means 140 in communication with a cap 200 and a collar 300.

The bottle 110 includes a shoulder portion 112 leading into a neck portion 114 with a defined opening 116 about an upper rim 118 to create an internal reservoir 120 for the holding of a liquid. The neck portion 114 includes a bottom annual bead 122 and at least two locking lugs 124 positioned on the neck portion 114 between the bottom annular bead 122 and the upper rim 118. The locking lugs 124 are preferably spaced 180° from each other. Each locking lugs 124 includes an entrance ramp 126 tapering downwardly towards the annual bead 122 leading into a channel 128. The channel 128 is positioned slightly higher than an end wall 123 of the entrance ramp 126 to create a seat 130 between end 123 of the entrance ramp 126 and a defined stop wall 132. The locking lugs 124 work in concert with corresponding latches 305 on the inside of the collar 300. To lock the collar 300 in position, the latches are positioned in the seat; while to unlock the collar 300, the collar 300 is pressed down until the latches are below the end wall 123 and twisted to move the latches into the entrance ramp 126 thereby releasing the collar 300 from the bottle 110. The end stop wall 132 extends towards the annular bead 122 to prevent rotation of the collar any further than the end stop wall 132. Additional lugs 135 and latches 305 may be positioned between the locking lugs to help prevent tampering of the collar 300.

The cap 200 has a top base 205 terminating to a side wall 210 that extends downwardly. The side wall 210 includes visual dosage markings 215 on the outside of the cap that are measured against the top rim 310 of the collar 300. As the cap 200 is raised or lowered in relation to the collar 300, the user can measure the dosage within the syringe by visually lining up the dosage markings 215 to the top rim 310 of the collar 300. The side wall 210 further include a bottom lip 217 extending outwardly from the side wall 210. Along one portion 220 of the side wall 210 is an indented section 225 that includes a flange 230 extending along the indented section 225 and attaching to an arm 235. The arm 235 is wider than the flange 230 to create a channel 240 along either side of the flange 230 defined between the indented section 225 and arm 235.

The syringe means 140 is a typical dispensing syringe that draws a liquid within the bottle 110 into a syringe 142 by an opening 144 on the bottom 146 of the syringe 142 and is capable of ejected the same out of the opening 144. The intake and ejection of the liquid occurs with a user manually move the cap 200 in relation to the collar 300. The syringe means 140 further includes a piston plug 148 secured to a piston 150 that is attached to and extends downwardly from an underside 250 of the top base 205 of the cap 200.

The collar 300 includes an external wall 315 extending from the top rim 310 to a bottom rim 320. Along a portion of the external wall 315 is an indented wall section 325 with a slot 330 extending through the external wall 315. The indented wall section 325 and slot 330 are configured to such that the flange 230 sits and slides within the slot 330 with the arm 235 positioned along the outside of the indented wall section 325 of the collar and the side wall 210 of the cap 200 situated on the inside of the collar 330 at the slot 330. The elements are configured to allow the cap 200 to slide up and down in relation to the collar 300, by having a sliding engagement between the flange 230 and slot 330.

Extending inwardly from the inside of the collar 330 is a surface member 335 that connects the external wall 315 to an internal well 335. The internal well 335 has an upstanding well wall 340 and a downwardly extending well wall 345. The upstanding well wall 340 extends upwardly towards the top rim 310 and is configured to receive the piston 150 extending from the cap 200. In addition, the piston plug 148 which is connected to the piston 150 is frictionally fitted within the upstanding well wall 340 such that movement of the cap out of the collar 300 causes suction within the syringe to draw liquid therein or causes liquid to expel from the syringe 140 when the cap is pressed downwardly into the collar 300.

The downwardly extending well wall 345 is configured to rest within the opening 120 of the bottle 110. The external wall 315 includes an internal surface 317 that is positioned against the outside or neck section 114 of the bottle. The latches 305 are situated on the internal surface 317 and configured as noted to engage the locking lugs 124. In addition, the internal well 335 includes radially inward lips defined as an upper lip 350 and lower lip 352 spaced to engage and capture a head 143 of the syringe 142, The collar 300 further includes a ledge 360 inwardly projection towards the top rim 310 and surface as a stop to the movement of the cap when the cap moves upwardly away to draw liquid into the syringe. The cap will stop moving when the bottom lip 217 extending outwardly from the side wall 210 makes contact with the ledge 360.

In operation, the user presses the cap upwardly from the collar, by pressing up on the arm, usually with a finger. This draws liquid into the syringe. The user further can measure the dosage by visually aligning the markings on the outside of the cap with the edge of the collar. The user then presses the collar down towards the bottle and twists to unlock the collar allowing the cap/collar to be separated from the bottle. To dispense, the user presses the cap down into the collar.

From the foregoing and as mentioned above, it is observed that numerous variations and modifications may be effected without departing from the spirit and scope of the novel concept of the invention. It is to be understood that no limitation with respect to the embodiments illustrated herein is intended or should be inferred. It is intended to cover, by the appended claims, all such modifications within the scope of the appended claims.

We claim:

1. A child-resistant adult-friendly bottle assembly to dispense a liquid, the bottle assembly comprising:
    a bottle having a neck portion defining an opening about an upper rim to create an internal reservoir for holding a liquid;
    a cap and collar assembly having a cap and a collar, the cap and collar assembly configured such that the cap is secured within the collar and vertically movable in relation to the collar;
    a child-resistant adult-friendly retention configuration configured to removably attach the cap and collar assembly to the neck portion of the bottle, the retention configuration defined by having:
        a pair of locking lugs being positioned on the neck portion;
        a pair of latches being positioned on an inside portion of the collar and separately corresponding to the pair of locking lugs, and wherein each locking lug includes an entrance ramp tapering downwardly towards the annular bead leading into a channel, the channel being positioned slightly higher than an end wall of the entrance ramp to create a seat between the end wall and a defined stop wall, whereby the collar is locked when the latches are positioned in the seats and the collar and cap assembly is removably from the bottle when the collar is pressed down until the latches are below the end wall and then the collar is twisted to move the latches into the entrance ramp thereby releasing the collar and cap assembly as a unit from the bottle, and wherein movement of the collar and cap assembly is separate from movement of the vertical movement of the cap in relation to the collar;
    a syringe means secured to the cap, the syringe means having a syringe tube positioned within the bottle when the cap and collar assembly is attached to the bottle, the syringe means configured to draw a liquid from the bottle when the cap is vertically moved away from the collar and the cap and collar assembly is attached to the bottle, and further configured to expel a liquid from the syringe tube when the cap is vertically moved towards the collar either when the cap and collar assembly is attached to the bottle or unattached to the bottle; and
    dosage marking indicia positioned downwardly along the cap and viewable on the outside of the cap as the cap is vertically moved in relation to the collar and wherein a dosage of liquid within the syringe tube is configured to match the dosage marking indicia as the cap is vertically moved and the dosage marking indicia aligns with a top rim of the collar.

2. The child-resistant adult-friendly bottle assembly of claim 1, wherein the cap includes:
    a top base terminating to a downwardly extending side wall;
    a bottom lip extending outwardly from the side wall; and
    an indented section being configured along a portion of the side wall, the indented section includes a flange extending along and attaching to an arm, the arm being wider than the flange to create channels on either side of the flange between the indented section and the arm.

3. The child-resistant adult-friendly bottle assembly of claim 2, wherein the collar includes:
    an external cylindrical wall extending from the top rim to a bottom rim;
    an indented wall section defined along a section of the external cylindrical wall, the indented wall section having a slot defined therein, wherein the indented wall section and slot are configured to receive the flange of the cap with the arm of the cap situated externally along the indented wall section on the external cylindrical wall and the side wall of the cap situated internally to the indented wall section of the collar to create vertical movement of the cap in relation to the collar;
    a ledge projecting inwardly from an internal surface of the external cylindrical wall and being positioned towards the top rim; and
    wherein the cap is vertically movable in relation to the collar with the ledge of the external cylindrical wall and the bottom lip acting together as an upper limit of movement between the cap and collar.

4. The child-resistant adult-friendly bottle assembly of claim 3, wherein the syringe means is configured to draw and expel a liquid as the cap is vertically moved in relation to the collar, the syringe means having a syringe tube with an opening configured to rest within the bottle to draw and expel a liquid; a piston extending downwardly from an underside portion of the top base of the cap portion; and a piston plug secured to the piston.

5. The child-resistant adult-friendly bottle assembly of claim 4, wherein the collar further includes:
- a surface member extending inwardly from the external cylindrical wall;
- an upstanding well wall and a downwardly extending well wall both extending from the surface member and defining an internal well opening within the upstanding and downwardly extending well walls;
- wherein the downwardly extending well wall is configured to rest within the opening of the bottle;
- wherein the internal well includes radially inward lips defined as an upper lip and lower lip spaced to engage and capture a head defined on a top portion of the syringe tube; and
- wherein the upstanding well wall is configured to receive the piston and frictionally fit the piston plug such that movement of the cap and thus piston and piston plug within the upstanding well wall draws and expel liquid from the syringe tube.

6. A child-resistant adult-friendly bottle assembly to dispense a liquid, the bottle assembly comprising:
- a bottle having a neck portion defining an opening about an upper rim to create an internal reservoir for holding a liquid;
- a cap and collar assembly defining a cap portion and a collar portion, the cap and collar assembly configured such that the cap portion is secured within the collar portion and vertically movable in relation to the collar portion;
- a child-resistant adult-friendly retaining means configured to removably attach the cap and collar assembly to the neck portion of the bottle, the child-resistant adult-friendly retaining means configured in a first position to lock the collar portion to the neck portion of the bottle and further configured in a second position to unlock the collar to allow the removal of the collar and cap assembly together as a unit from the bottle, wherein movement of the collar, separate from movement of the cap, manually being pressed down towards the bottle and rotated in a first direction unlocks the collar and cap assembly from the bottle, and wherein the neck portion of the bottle further includes a bottom annular bead and a pair of locking lugs, the pair of locking lugs being positioned on the neck portion between the bottom annular bead and the upper rim; and
- a syringe means secured to the cap portion, the syringe means having a syringe tube positioned within the bottle when the cap and collar assembly is attached to the bottle, the syringe means configured to draw a liquid from the bottle when the cap portion is vertically moved away from the collar portion and the cap and collar assembly is attached to the bottle, and further configured to expel a liquid from the syringe tube when the cap portion is vertically moved towards the collar portion either when the cap and collar assembly is attached to the bottle or unattached to the bottle.

7. The child-resistant adult-friendly bottle assembly of claim 6, wherein the cap portion includes:
- a top base terminating to a downwardly extending side wall;
- dosage marking indicia positioned downwardly along the side wall and viewable on the outside of the cap portion as the cap portion is vertically moved in relation to the collar portion;
- a bottom lip extending outwardly from the side wall; and
- an indented section being configured along a portion of the side wall, the indented section includes a flange extending along and attaching to an arm, the arm being wider than the flange to create channels on either side of the flange between the indented section and the arm.

8. The child-resistant adult-friendly bottle assembly of claim 7, wherein the collar portion includes:
- an external cylindrical wall extending from a top rim to a bottom rim;
- an indented wall section defined along a section of the external cylindrical wall, the indented wall section having a slot defined therein, wherein the indented wall section and slot are configured to receive the flange of the cap portion with the arm of the cap portion situated externally along the indented wall section on the external cylindrical wall and the side wall of the cap portion situated internally to the indented wall section of the collar portion to create vertical movement of the cap portion in relation to the collar portion;
- a ledge projecting inwardly from an internal surface of the external cylindrical wall and being positioned towards the top rim; and
- wherein the cap portion is vertically movable in relation to the collar portion with the ledge of the external cylindrical wall and the bottom lip acting together as an upper limit of movement between the cap portion and collar portion.

9. The child-resistant adult-friendly bottle assembly of claim 8, wherein a dosage of liquid within the syringe tube is configured to match the dosage marking indicia as the cap portion is moved and the dosage marking indicia aligns with the top rim of the collar portion.

10. The child-resistant adult-friendly bottle assembly of claim 9, wherein the syringe means is configured to draw and expel a liquid as the cap portion is vertically moved in relation to the collar portion, the syringe means having:
- a syringe tube with an opening configured to rest within the bottle to draw and expel a liquid; a piston extending downwardly from an underside portion of the top base of the cap portion; and a piston plug secured to the piston.

11. The child-resistant adult-friendly bottle assembly of claim 10, wherein the collar portion further includes:
- a surface member extending inwardly from the external cylindrical wall
- an upstanding well wall and a downwardly extending well wall both extending from the surface member and defining an internal well opening within the upstanding and downwardly extending well walls;
- wherein the downwardly extending well wall is configured to rest within the opening of the bottle;
- wherein the internal well includes radially inward lips defined as an upper lip and lower lip spaced to engage and capture a head defined on a top portion of the syringe tube; and
- wherein the upstanding well wall is configured to receive the piston and frictionally fit the piston plug such that movement of the cap portion and thus piston and piston plug within the upstanding well wall draws and expel liquid from the syringe tube.

12. The child-resistant adult-friendly bottle assembly of claim 11, further comprising:
- a pair of latches secured to an inside portion of the collar and separately corresponding to each of the locking lugs, in the pair of locking lugs, and wherein each locking lug includes an entrance ramp tapering downwardly towards the annular bead leading into a channel, the channel being positioned slightly higher than an end wall of the entrance ramp to create a seat between the end wall and a defined stop wall, whereby the collar portion is locked when the latches are positioned in the seats and the collar and cap assembly is removably from the bottle when the collar portion is pressed down until the latches are below the end wall and then the collar portion is twisted to move the latches into the entrance ramp thereby releasing the collar and cap assembly from the bottle.

13. The child-resistant adult-friendly bottle assembly of claim 11, wherein the pair locking lugs are preferably spaced 180° from each other around the neck portion.

* * * * *